UNITED STATES PATENT OFFICE.

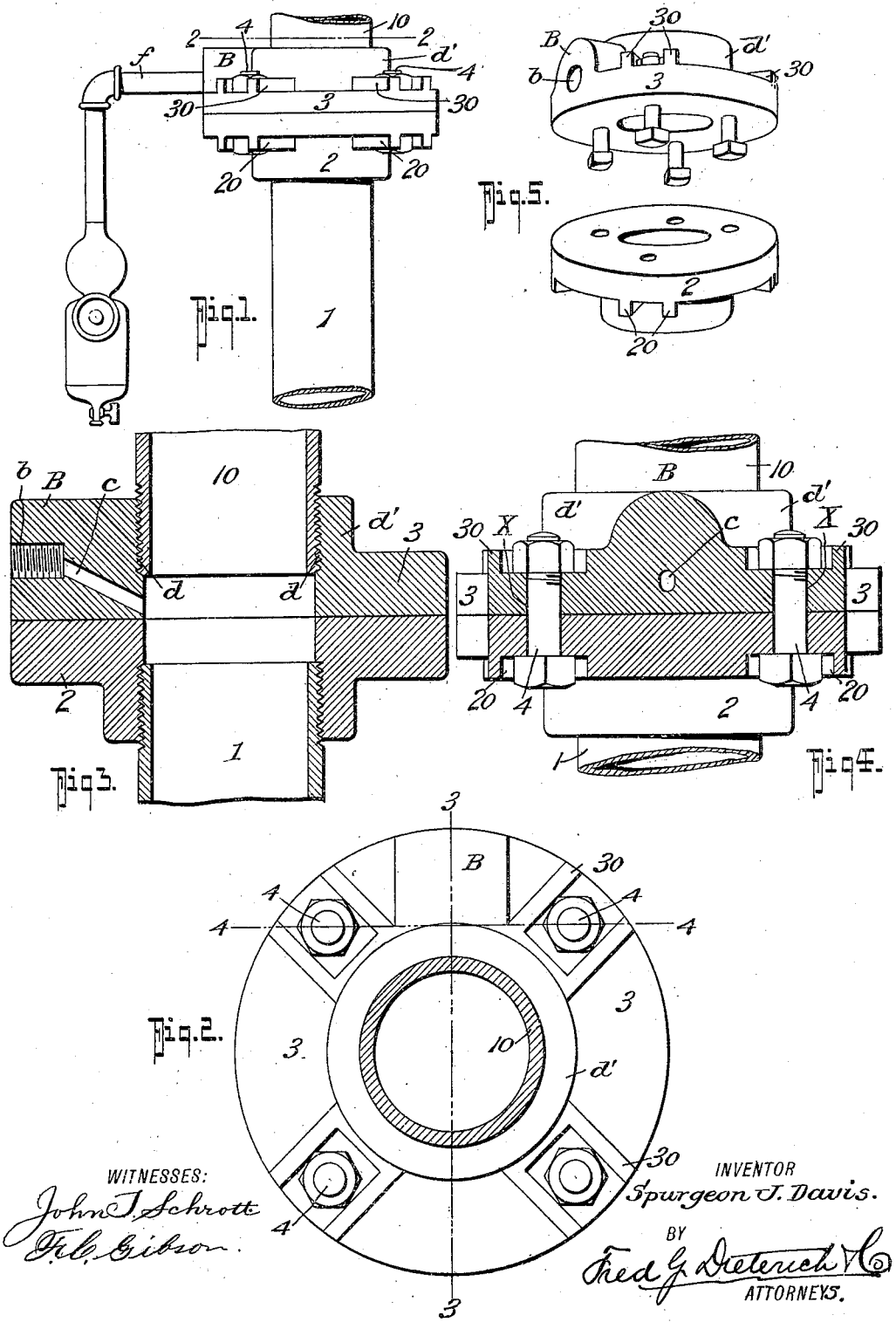

SPURGEON J. DAVIS, OF OSTRANDER, WASHINGTON, ASSIGNOR TO WASHINGTON IRON WORKS, OF SEATTLE, WASHINGTON.

FLANGE UNION.

No. 922,755.  Specification of Letters Patent.  Patented May 25, 1909.

Application filed December 11, 1906. Serial No. 347,296.

*To all whom it may concern:*

Be it known that I, SPURGEON J. DAVIS, residing at Ostrander, in the county of Cowlitz and State of Washington, have invented a new and Improved Flange Union, of which the following is a specification.

This invention relates to improvements in that class of unions, more particularly designed for a coupling hard metal pipe to a soft metal pipe, and it primarily has for its object to provide a coupling device of the character stated, of a simple and economical construction and which is especially well adapted for making connection of upper lubricator pipes to the leading pipes.

My invention comprehends an improved construction of unions in the lead or main pipe, which includes a member having special provision for making a screw tap therein whereby to detachably connect the upper lubricator pipe with the said union member, by means of which the said lubricator pipe is brought into communication with a port that discharges into the center passage of the union and at a point below the internal threaded portion of the said union member, whereby to provide for the required maximum amount of screw tap for joining the main pipe to the union and also enough metal for the proper insertion for the lubricant pipe.

In its more subordinate features, my invention consists in peculiar details of construction and combination of parts, hereinafter fully described, specifically set out in the claim and illustrated in the accompanying drawings, in which:—

Figure 1, is a side elevation of a leading pipe with my improved union coupling thereon, the lubricator being shown attached to the pipe and the union. Fig. 2, is a horizontal section thereof on the line 2—2 on Fig. 1. Fig. 3, is a vertical longitudinal section on the line 3—3 of Fig. 2. Fig. 4, is a transverse section thereof on the line 4—4 of Fig. 2. Fig. 5, is a detail perspective view of the main union member hereinafter specifically referred to.

In carrying out my invention I secure on the end of one section 1 of the leading pipes, a union flange 2, which is threaded to the said pipe section as clearly shown in Fig. 3, the said union having the usual radial nut receiving pockets 20, as shown. Upon the other pipe section 10 is fitted the other or main union member 3, also provided with radial pockets 30 in the nut heads and the said nut member 3, as well as its mate, have registering apertures X to receive the fastening bolts 4, as shown.

The union member 3, at one side has a semi-circular solid portion B, which at a point midway its height has a threaded tap $b$ that extends inwardly about half the distance between the outer rim of the flange and the central opening of the said flange member, at which point the tap $b$ communicates with a port or channel $c$ that extends diagonally downwardly and inwardly and communicates with the central or pipe opening of the flange at a point below the threads $d$ of the main screw tap $d'$. By thus constructing the union member 3 sufficient metal is provided for making a tap for receiving the upper pipe $f$ of a lubricator and establishing communication between the said lubricator and the main pipe 1 without shortening or otherwise interfering with the central tap connection between the main pipe and the said union member.

By arranging the union member as stated, an economical means is provided for attaching the lubricator pipe over the usual method, since it saves making two joints in the leading pipe.

Having thus described my invention, what I claim and desire to secure by Letters Patent, is:—

A flange coupling for pipes, which comprises the following elements in combination, a pair of opposing union members, each having a central bore and annular portions adapted to lie flatwise against each other, means coöperating with the annular portions for clamping the two members together, each member having its bore internally threaded from a point near the contacting face of the members to the outer extremity, one of the said members having a radially extended solid portion, and having a radially disposed screw tap that extends inwardly and a passage of reduced diameter that communicates at one end with the said tap and at the other end with the central bore at a point inside of the threaded portion, all being arranged substantially as shown and for the purpose described.

SPURGEON J. DAVIS.

Witnesses:
M. J. McGUINNESS,
ANDREW McGUINNESS.